(12) United States Patent
Vikberg et al.

(10) Patent No.: US 8,682,310 B2
(45) Date of Patent: Mar. 25, 2014

(54) NETWORK-BASED AREA POSITIONING FOR CAPACITY AND COVERAGE IMPROVEMENT

(75) Inventors: Jari Vikberg, Järna (SE); Tomas Nylander, Värmdö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 266 days.

(21) Appl. No.: 12/970,293

(22) Filed: Dec. 16, 2010

(65) Prior Publication Data

US 2011/0294499 A1    Dec. 1, 2011

Related U.S. Application Data

(60) Provisional application No. 61/349,376, filed on May 28, 2010.

(51) Int. Cl.
*H04M 11/00*    (2006.01)
*H04W 40/00*    (2009.01)
*H04W 24/00*    (2009.01)

(52) U.S. Cl.
USPC .......................... 455/421; 455/446; 455/456.1

(58) Field of Classification Search
USPC ........... 455/421, 422.1, 423–425, 446, 456.1, 455/456.5, 67.11
See application file for complete search history.

(56) References Cited

U.S. PATENT DOCUMENTS

| | | | |
|---|---|---|---|
| 7,206,573 B1 * | 4/2007 | Weaver et al. | 455/423 |
| 2007/0243881 A1 | 10/2007 | Roskowski | |
| 2009/0257353 A1 | 10/2009 | Song et al. | |
| 2009/0318132 A1 * | 12/2009 | Chiou et al. | 455/423 |
| 2011/0128862 A1 * | 6/2011 | Kallin et al. | 370/245 |

FOREIGN PATENT DOCUMENTS

| | | |
|---|---|---|
| WO | 2006063309 A1 | 6/2006 |
| WO | 2010040417 A1 | 4/2010 |

* cited by examiner

*Primary Examiner* — Wesley Kim
(74) *Attorney, Agent, or Firm* — Coats & Bennett, P.L.L.C.

(57) ABSTRACT

Localized areas within a cell of a cellular wireless communication network, wherein users experience high traffic loads or poor coverage, are automatically detected and positioned by a network-based monitoring and positioning method. The localized areas are detected by performing measurements (e.g., TAdv, AOA, and neighbor node measurements) on User Equipment (UE) indicating or recording a network capacity or coverage deficiency. The detected, localized area of deficient performance is then positioned (e.g., in latitude and longitude), such as by positioning one or more UE within the area. The deficient network capacity or coverage, the localized area in which it is concentrated, and the position of the localized area are then reported, with a recommendation to deploy a low-power serving node within the localized area (e.g., at or near the area reported position) to alleviate the capacity or coverage deficiency, while minimizing interference with communication services to other users within the cell.

6 Claims, 4 Drawing Sheets

NETWORK-BASED AREA POSITIONING FOR CAPACITY AND COVERAGE IMPROVEMENT

RELATED APPLICATIONS

This application claims priority to U.S. Provisional Patent Application Ser. No. 61/349,376, filed May 28, 2010, the disclosure of which is incorporated herein by reference in its entirety.

BACKGROUND

Cellular wireless communication networks are ubiquitous in many parts of the world. Providing sufficient capacity and coverage in a cell is an ongoing challenge. In most cellular networks there are areas of high traffic, i.e., high concentration of users. In those areas the network operator would normally like to deploy additional capacity, to provide a satisfying user experience. The added capacity may be in the form of one or more additional macro base stations, or other nodes with low output power, which cover a relatively small area, in order to concentrate the capacity boost over only the area of increased user traffic.

Additionally, many cells have areas with relatively poor coverage (e.g., poor signal quality), where there is a need for coverage extension. Again, one way to accomplish improved coverage is to deploy a node with low output power, to concentrate the coverage boost in a small area.

In both cases, choosing nodes with relatively low output power minimizes the impact on the macro network. That is, the area in which the macro network may experience interference is minimized. Currently, there is a strong drive in the industry towards the use of low power nodes. These networks are known as Heterogeneous networks ("HetNets"), or multilayer networks. FIG. 1 depicts a network 10 in which a macro base station 12 provides wireless communication services over a wide area or cell 14. Additionally, low power nodes are deployed to provide additional capacity/coverage over small areas, for example pico base stations 16, relays 18, and home base stations, or femto cells 20.

Currently, areas with deficient capacity or coverage are discovered by network operator experience, or perhaps by customer complaints. In the case of poor coverage, there is some standardization effort ongoing to complement these methods. The standardization effort addresses the problem using User Equipment (UE) support. According to these methods, a UE should store its location when it loses coverage, and later when it again connects to the wireless network, the UE reports the occurrence of lost coverage and the position at which it occurred. However, since this solution relies on UE support—a feature that will probably be optional—it is unclear when such a solution may appear on the market. Therefore a network-based solution might be beneficial.

With a network-based method of determining areas needing additional capacity or experiencing poor coverage, the network operator has the opportunity to proactively address problematic areas, and avoid user complaints about dropped calls or poor performance.

SUMMARY

According to one or more embodiments described and claimed herein, localized areas within a cell of a cellular wireless communication network, wherein users experience bad performance due to high traffic loads or poor coverage, are automatically detected and positioned by a network-based monitoring and positioning method. The localized areas are detected by performing measurements, e.g., Timing Advance (TAdv), Angle Of Arrival (AOA), and neighbor node measurements, on User Equipment (UE) indicating a network capacity or coverage deficiency. The detected, localized area of deficient performance is then positioned (e.g., in latitude and longitude), such as by positioning one or more UE within the area. The deficient network capacity or coverage, the localized area in which it is concentrated, and the position of the localized area are then reported, with a recommendation to deploy a low-power serving node within the localized area (e.g., at or near the area reported position) to alleviate the capacity or coverage deficiency, while minimizing interference with communication services to other users within the cell.

One embodiment relates to a network-based method of improving communications in a cellular wireless communication network wherein a first serving node provides communication services to users in a cell covering a geographic area. The method is performed by an Application Server or Operation and Support System in the network. User activity is monitored to detect deficient capacity, and user link quality is monitored to detect deficient coverage. A geographic position of at least one user experiencing deficient capacity or coverage is determined. In response to a pattern of capacity or coverage deficiency at a position in the cell, it is determined that a second serving node should be deployed near the determined position to alleviate the deficiency, wherein the second serving node transmits at lower power level than the first serving node.

Another embodiment relates to a network node operative to function as an Application Server or Operation and Support System in a cellular wireless communication network. The network node includes a network interface operative to communicate with a first serving node providing communication services to users in a cell covering a geographic area. The network node also includes a controller operatively connected to the transceiver and operative to monitor the activity of users in the cell to detect deficient capacity and to monitor the link quality of users in the cell to detect deficient coverage. The controller is further operative to determine a geographic position of at least one user experiencing deficient capacity or coverage. In response to a pattern of capacity or coverage deficiency at a position in the cell, the controller is operative to determine that a second serving node should be deployed near the determined position to alleviate the deficiency, wherein the second serving node transmits at lower power level than the first serving node.

Yet another embodiment relates to a network-based method of improving communications in a cellular wireless communication network wherein a first serving node including a first transceiver provides communication services to users in a cell covering a geographic area, the method performed by the serving node. User activity is monitoring and it is determined that the cell has deficient capacity if a traffic load exceeds a predetermined load threshold. User link quality metrics for users in the cell are monitored and it is determined that the cell has deficient coverage if a link quality metrics for a predetermined number of users fall below a predetermined quality threshold. A geographic position of one or more users in the cell; is determined. In response to a pattern of capacity or coverage deficiency in the cell, it is determined that a second serving node should be deployed near the determined position to alleviate the deficiency. The second serving node transmits at lower power level than the first serving node.

Still another embodiment relates to a serving node in a cellular wireless communication network operative to provide communication services to users in a cell covering a geographic area. The serving node includes a transceiver and a position measurement unit operatively connected to the transceiver and operative to perform measurements selected from the group consisting of Timing Advance (TAdv), Angle of Arrival (AOA), and neighboring nodes signal strength, on user terminals within the cell. The serving node further includes a network interface operative to communicate with other network nodes, and a controller operatively connected to the transceiver and the position measurement unit. The controller is operative to provide communication services to users in the cell, and to monitor traffic load and link quality metrics. The controller is further operative to detect a capacity or coverage deficiency based on monitored traffic load and link quality, and to determine whether a detected deficiency is localized in an area of the cell in response to the measurements. The controller is also operative to position one or more users in the localized area.

DETAILED DESCRIPTION

To provide a complete disclosure, enabling those of skill in the art to make and use embodiments of the present invention, the invention is described herein in the specific context of the Evolved Universal Mobile Telecommunications System (UMTS) Terrestrial Radio Access Network (E-UTRAN), also known as Long Term Evolution (LTE) radio access network, and Evolved Packet Core (EPC), also known as System Architecture Evolution (SAE) core network, which are the radio access network and core network, respectively, of the Third Generation Partnership Project (3GPP) LTE/SAE wireless communication network 10. However, the invention is not limited to this particular wireless network specification or protocol, and may be advantageously deployed in a variety of systems, such as WCDMA, GSM, WiMax, and the like. A brief overview of positioning in LTE follows, with reference to FIG. 2.

Figure 1:
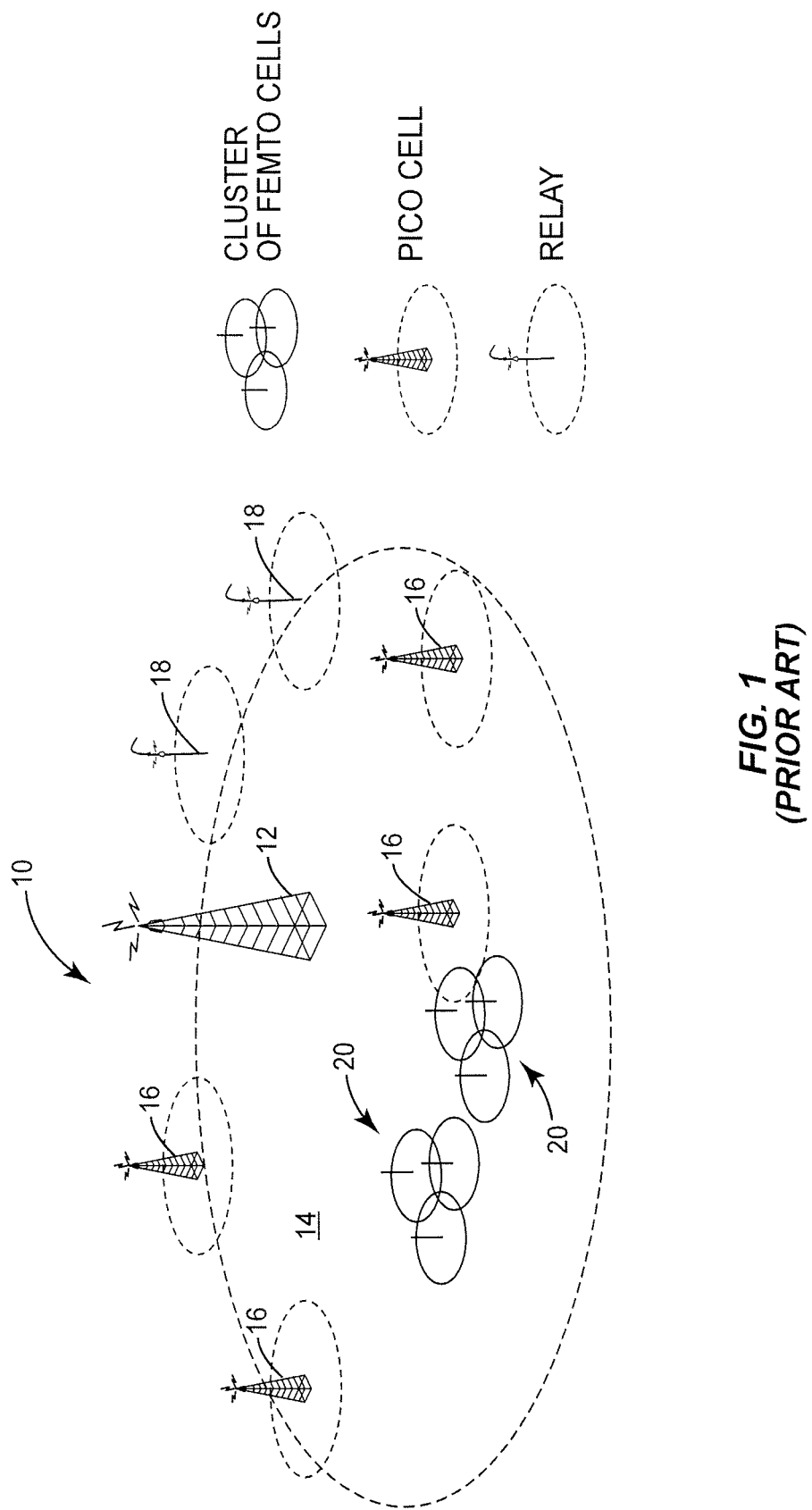
FIG. 1 is a functional block diagram of one cell of a cellular wireless communication network, having low-power cells deployed therein.
Figure 2:
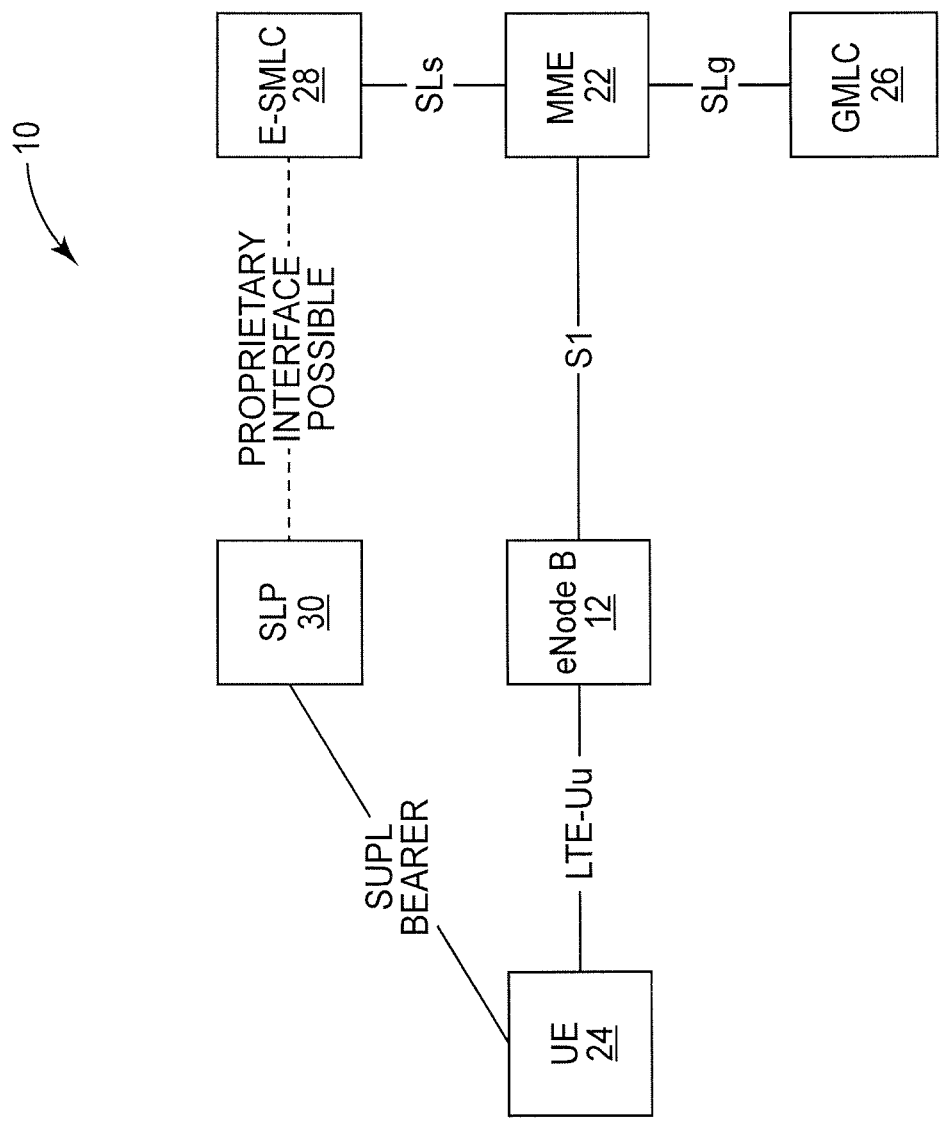
FIG. 2 is a block diagram of positioning nodes in a wireless communication network.

3GPP specifies a variety of positioning methods, by which the geographic position of User Equipment (UE) may be estimated, either by the UE itself or by a node in the network, such as the evolved Node B (eNode B, or eNB) 12, or "base station" serving the UE. FIG. 2 depicts the network nodes that may be involved in a positioning operation, according to one embodiment of an LTE network 10. A Mobility Management Entity (MME) 22 receives a request for some location service associated with a particular target UE 24 from another entity (e.g., Gateway Mobile Location Center (GMLC) 26 over the SLg-interface, or UE 24) or the MME 22 itself may decide to initiate some location service on behalf of a particular target UE 24.

The MME 22 then sends a location services request to an Evolved Serving Mobile Location Center (E-SMLC) 28 over the SLs-interface. The E-SMLC 28 processes the location services request, which may include transferring assistance data to the target UE 24 to assist with UE-based and/or UE-assisted positioning, and/or may include positioning of the target UE 24. If the UE 24 includes Secure User Plane Location (SUPL) technology, it may utilize the services of a SUPL Location Platform (SLP) 30 to assist in positioning (e.g., obtain Assisted-GPS, or A-GPS data). The E-SMLC 28 then returns the result of the location service back to the MME 22 (e.g., a position estimate for the UE 24 and/or an indication of any assistance data transferred to the UE 24). In the case of a location service requested by an entity other than the MME 22 (e.g., GMLC 26 or UE 24), the MME 22 returns the location service result to this entity.

Figure 3:
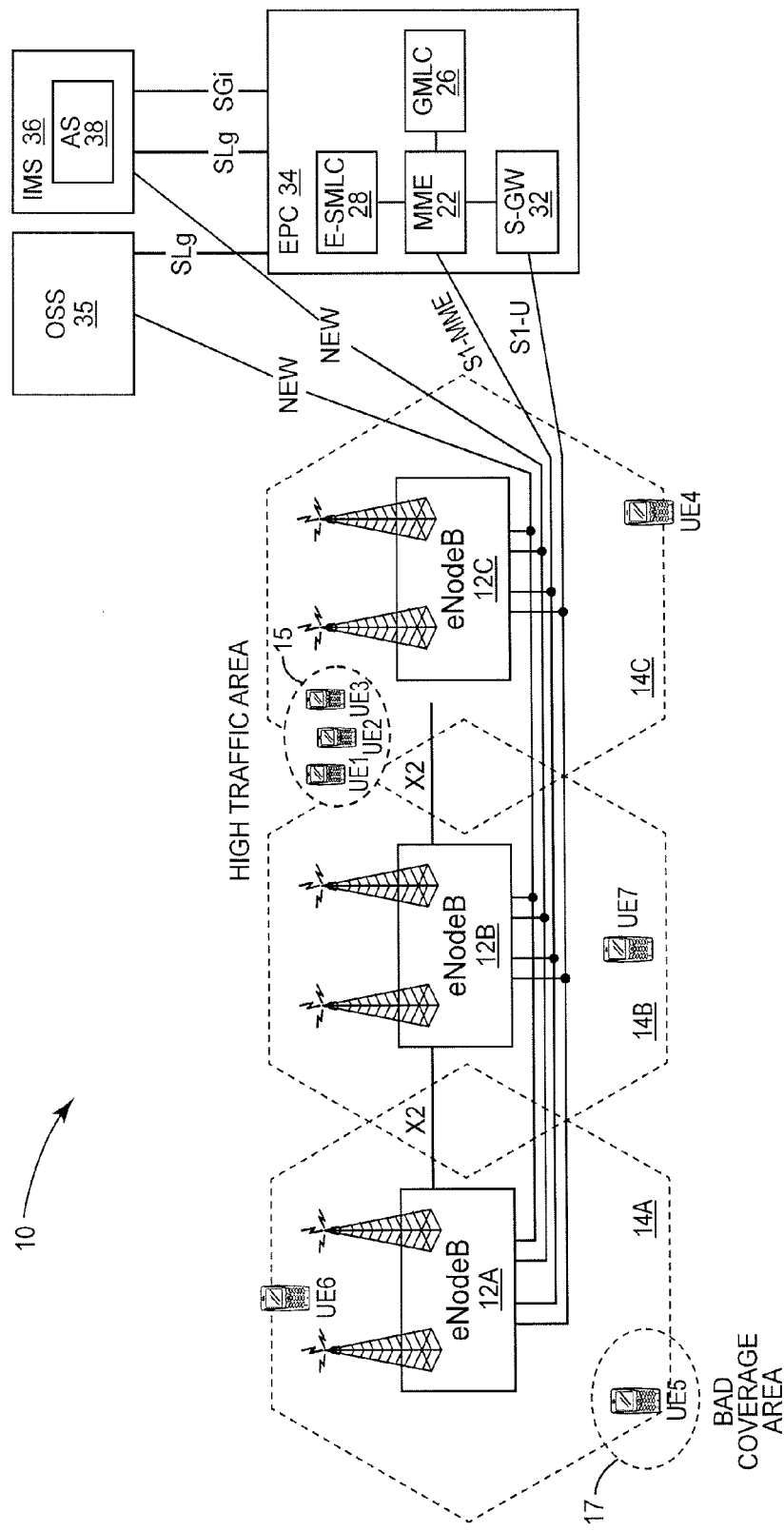
FIG. 3 is a functional block diagram of a cellular wireless communication network having localized areas of high traffic and bad coverage.

FIG. 3 depicts a portion of a representative LTE network 10. The E-UTRAN includes three eNode Bs 12A, 12B, 12C, serving users in three cells 14A, 14B, 14C, respectively. Of course, in general, an eNode B 12A, 12B, 12C may include numerous cells. The eNode Bs 12A, 12B, 12C are connected to the EPC 34. The two towers depicted on each eNode B 12A, 12B, 12C represent two antennas, which are not necessarily mounted on different towers. The two antennas allow each eNode B 12A, 12B, 12C to perform Angle Of Arrival (AOA) measurements on signals from UEs 1-7. Of course, in general, an eNode B 12A, 12B, 12C may include numerous antennas, such as for Multiple-Input, Multiple-Output (MIMO) operation. The presence of at least two antennas for at least one eNode B 12A, 12B, 12C is relevant to one embodiment of the present invention for the AOA measurement capability.

The EPC nodes depicted are the MME 22, GMLC 26, E-SMLC 28, and a Serving GateWay (S-GW) 32; additional network nodes are omitted for clarity. The EPC 34 is connected for example via SGi-interface to an IP Multimedia Subsystem (IMS) 36. This interface can carry for example Session Initiation Protocol (SIP) signaling between the UEs and the IMS. The EPC 34 is also connected to the IMS via an enhanced SLg-interface. The E-UTRAN (i.e., e Node B 12A, 12B, 12C) is also connected to the IMS 36 over a new interface that can carry new signaling between the e Node Bs 12A, 12B, 12C and the IMS 36. The IMS 36 includes, in addition to numerous network nodes not depicted for clarity (such as P-CSCF, I-CSCF, S-CSCF, and the like), an Application Server (AS) 38. The AS 38 is operative to provide various services to various users and network 10 nodes. As described herein, in some embodiments, the AS 38 provides network-based capacity/congestion area detection and reporting services to the EPC 34. An Operation and Support System (OSS) 35 is also connected to the E-UTRAN (i.e., the eNode Bs 12A, 12B, 12C) over a new interface that can carry new signaling, as described herein. The OSS 35 is also connected to the MME 22 in the EPC 34 via an enhanced SLg-interface, As depicted in FIG. 3, a large number of UEs 1-3 are concentrated in a first localized area 15 of the cell 14C. These UEs 1-3 impose a high traffic load on the network 10, primarily via eNode B 12C. This may strain system resources, reducing the data rate that can be provided to each UE 1-3, and resulting in a relatively poor perceived user experience, as compared to a network with sufficient capacity to adequately service all UEs 1-3. FIG. 3 also depicts a UE 5 in a second localized area 17 of cell 14A, in which the UE 5 experiences bad coverage. That is, for some reason (e.g., geography, urban canyons, or the like), signal quality in the localized area 17 is lower than elsewhere in the network 10, resulting in, e.g., poor voice quality, reduced data rates, and possibly dropped calls. This, again, results in a relatively poor perceived user experience.

Figure 4:
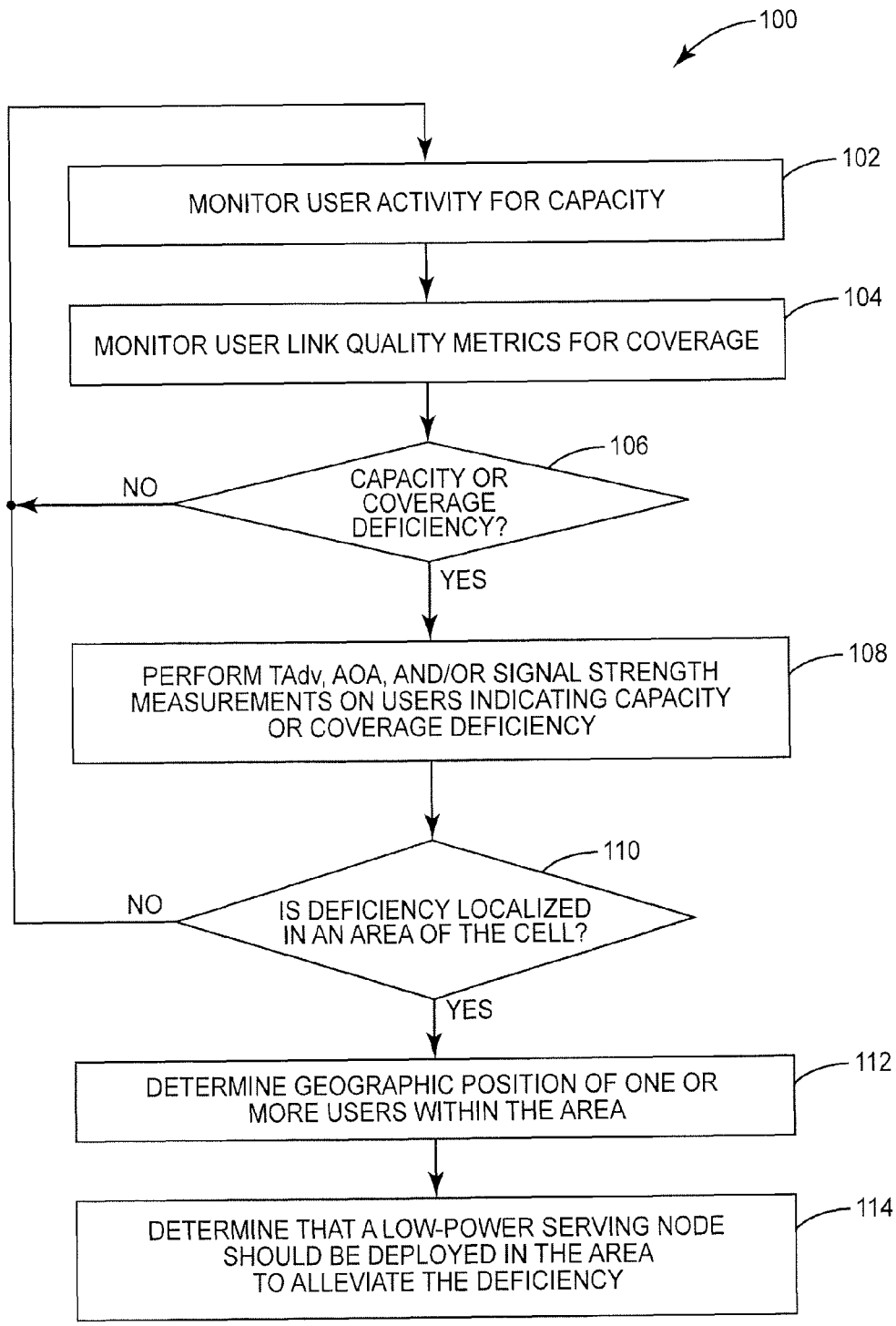
FIG. 4 is a flow diagram of a network-based method of improving communications in a cellular wireless communication network by detecting, positioning, and reporting the localized areas depicted in FIG. 3.

According to embodiments described and claimed herein, a network-based method 100, depicted in FIG. 4 and performed at one or more network nodes, automatically monitors user activity in a cellular wireless communication network 10 to detect a capacity deficiency (block 102), and monitors user signal or link quality metrics to detect a coverage deficiency (block 104). If either type of monitoring indicates a network deficiency (block 106), the network 10 performs measurements on the users discovered, during the monitoring, to experience deficient network performance (block 108). Based on these measurements, the network 10 determines whether the detected capacity or coverage deficiency is localized within an area 15, 17 of the cell 14A, 14C, respectively (block 110). If the detected capacity or coverage deficiency is localized to an area 15, 17, the area 15, 17 is positioned (block 112), such as by performing positioning operations on one or more UE1, UE2, UE3, UE5 in the area 15, 17. The network then determines, and reports, the area 15, 17, the performance deficiency associated with the area 15, 17, the position of the area 15, 17, and recommends the deployment of one or more relatively low-power cells to the area 15, 17 (block 114), to alleviate the detected and positioned operational deficiency. Each of these steps is elaborated in the discussions to follow.

In the case of a capacity deficiency, the network 10 must ascertain that a high traffic load exists, and whether the high traffic load is concentrated in a localized area 15 (i.e., whether deploying a low-power node would be beneficial to relieve the congestion). If so, the network 10 must position the area 15 (i.e., determine the latitude and longitude of at least one point in the area 15—such as the location of a UE 1-3 within the area 15), and formulate and present recommendations to a network operator.

Similarly, in the case of a coverage deficiency, the network 10 must ascertain that one or more UEs 5 are experiencing poor coverage with no available intra LTE handoff, and whether the coverage deficiency is concentrated in a localized area 15 (i.e., whether deploying a low-power node would be beneficial to improve signal quality). If so, the network 10 must position the area 15 (i.e., determine the latitude and longitude of at least one point in the area 15), and formulate and present recommendations to a network operator.

Capacity Deficiency

To detect high traffic loads, the eNode B 12C may compare traffic loads to a configurable threshold, e.g., number of simultaneous users, number of packets scheduled per frame, average achievable data rate, or the like.

To determine whether detected high traffic is concentrated in a localized area 15, the eNode B 12C may initiate Timing Advance (TAdv) measurements. This estimates the range, or distance from the eNode B 12C, of the UEs 1-3. For example, the eNode B 12C may always or periodically include a standardized ueRxTxTimeDiff order when sending measurement orders to UEs 1-3. Additionally or alternatively, the eNode B 12C may perform AOA measurement. This determines the angular direction (from a reference direction) of the signal received by the eNode B 12C, from the time difference on the two or more antennas on which UE 1-3 signals are received. UEs 1-3 whose signals are received from the same direction are likely located in the same localized area 15, particularly if TAdv measurements indicate they are roughly the same distance from the eNode B 12C. The eNode B 12C may additionally take into account measurement reports from UEs 1-3 wherein the same neighbor network cells and/or nodes are indicated and similar signal strength/quality is reported. For example, FIG. 3 depicts the high traffic area 15 as near the border between cells 14C and 14B; hence, UEs 1-3 likely will all report eNode B 12B as a neighbor node, with similar signal strength/quality from eNode B 12B. Based on any of these measurements, or preferably a combination to two or more of them, the eNode B 12C determines that UEs 1-3 experiencing a high traffic load are located in the same localized area 15 of the cell 14C.

Once the eNode B 12C determines that a localized area 15 of high traffic load exists within the cell 14C, it must position the area, to be able to recommend deployment of a low-power serving node. This positioning may be accomplished in numerous ways, according to embodiments of the present invention.

In one embodiment, the eNode B 12C sends a new request to the MME 22 on the S1AP interface, requesting the MME 22 to position one of the UEs 1-3. The request can be included either in a modified existing message or in a new message. This request may indicate a preferred positioning methodology, such as GPS. The MME 22 triggers a 'location request' towards the E-SMLC 28, as known in the art. The E-SMLC 28 performs positioning of the requested UE 1-3 using standard methods. The E-SMLC 28 reports the latitude and longitude of the requested UE 1-3 back to the MME 22 in a 'location response' message using standard signaling. The MME then reports the latitude and longitude of the requested UE 1-3 back to the eNode B 12C. The response can also be included either in a modified existing message or in a new message. The request from the eNode B 12C to the MME 22 and the response from the MME 22 to the eNode B 12C are sent over an existing signaling connection in the S1-MME interface. This signaling connection is UE-specific and is identified by S1AP identifiers allocated by both the eNode B 12C and the MME 22. The S1AP identifiers are necessary since, for security reasons, the eNode B 12C should remain unaware of the UE permanent identifiers, such as an IMSI, used by the MME 22 in triggering a positioning request to the E-SMLC 28.

In another embodiment, the eNode B 12C reports to the AS 38 or OSS 35 that positioning is needed, and forwards to the AS 38 or OSS 35 the MME/eNode B S1AP Identities for the selected UEs and the concerned MME 22. The AS 38 may, for example, provide an application that collects, monitors, analyzes, and presents network 10 statistics and events, and implements a network-based method of detecting and reporting localized areas 15 of capacity and/or coverage deficiency. The AS 38 or OSS 35 functions as a GMLC 26, and triggers positioning requests to the MME 22. This embodiment requires modification to SLg protocol between the MME 22 and GMLC 26 used to provide location information, since UE 1-3 permanent identifiers, such as the International Mobile Subscriber Identity (IMSI), the Mobile Subscriber Integrated Services Digital Network Number (MSISDN) or the International Mobile Equipment Identity (IMEI) are normally used as identifiers over this interface. For security reasons, the AS 38 or OSS 35 and MME 22 should instead use the MME/eNode B S1AP identities. In an alternate embodiment, the MME 22 informs the AS 38 or OSS 35 about IMSIs (or other identifiers) corresponding to MME/eNode B S1AP Identities. The AS 38 or OSS 35 then uses the IMSIs towards the MME 22 when triggering positioning. The eNode B 12C must also send to the AS 38 or OSS 35 an identity of the MME 22 to which the AS 38 or OSS 35 should direct positioning requests.

In yet another embodiment, the eNode B 12C reports to the AS 38 information about TAdv, AOA and Measured neighbors measurements. The AS 38 maintains statistics, and detects frequently-occurring combinations of TAdv, AOA and measurements. Over time, when enough data has been gathered and the AS 38 detects a localized area 15 of interest, the AS 38 asks the eNode B 12C to position some UEs in this area, such as via the MME 22, as described above.

After a localized area 15 of the cell 12C experiencing high traffic load has been identified and positioned, the AS 38 compiles and presents information, including a recommendation for deployment of a low-power node to alleviate congestion in the area 15. This may be accomplished in several ways. In one embodiment, the eNode B 12C sends information to the AS 38 about potential high capacity area, i.e., anonymous UEs and latitude/longitude. The AS 38 then compiles this information and formulates a report. In another embodiment, the AS 38 receives latitude/longitude for the area 15 from the MME 22 (i.e., the AS 38 acts as a GMLC). In yet another embodiment, the eNode B 12C positions the area 15 via the MME 22, as described above, and forwards this information to the AS 38. In any of these embodiments, the AS 38 may compile statistics over and extended period, and may maintain the data so that the existence of localized areas 15 of high traffic load, and conclusions regarding the deployment of a low-power node in the cell 14C, may be verified.

Coverage Deficiency

Similarly, in the case of a coverage deficiency, the network 10 must ascertain that one or more UEs 5 are experiencing poor coverage with no available intra-LTE handoff, and whether the coverage deficiency is concentrated in a localized area 17 (i.e., whether deploying a low-power node would be beneficial to improve signal quality). If so, the network 10 must position the area 17 (i.e., determine the latitude and longitude of at least one point in the area 17), and formulate and present recommendations to a network operator.

To determine deficient signal quality, the eNode B 12A can trigger on measurements indicating poor signal strength and/or quality on serving cell 14A and intra-RAT neighbors (e.g., eNode B 12B). Another trigger may be UE Triggered Connection Re-activation occurring after the connection to the UE 5 has been lost.

Similarly to the case of capacity deficiency, a combination of actions can provide information about the localized area 17 in the cell 14A in which poor coverage is concentrated. In one embodiment, the eNode B 12A may initiate Timing Advance (TAdv) measurements, to estimate the range, or distance from the e Node B 12A, of a UE 5. For example, the eNode B 12A may always or periodically include a standardized ueRxTx-TimeDiff order when sending measurement orders to a UE 5. Additionally or alternatively, the eNode B 12A may perform AOA measurement to determine the angular direction (from a reference direction) of the signal received by the eNode B 12A. The eNode B 12A may additionally take into account measurement reports from a UE 5 wherein the same inter-RAT neighbors are indicated and similar signal strength/quality is reported. Thresholds or other criteria may be developed, to trigger area 17 positioning when the above measurements, i.e., similar TAdv, AOA, and neighbors and measurement results in measurement reports, coincide for a plurality of UE 5 that are lost.

Once UEs 5 experiencing poor signal strength/quality and/or losing connection are determined to be in a localized area 17, the eNode B 12A selects one or more UE 5 that are getting close to the triggering criteria, near where other UEs have lost connection, and triggers positioning operations for the selected UE 5. The same variations are available here as in the case of capacity deficiency, discussed above.

In one embodiment, the eNode B 12A sends a new request to the MME 22 on the S1AP interface, requesting the MME 22 to position the UE 5. The request can be included either in a modified existing message or in a new message. This request may indicate a preferred positioning methodology, such as GPS. The MME 22 triggers 'location request' towards the E-SMLC 28, as known in the art. The E-SMLC 28 performs positioning of the requested UE 5 using standard methods. The E-SMLC 28 reports the latitude and longitude of the requested UE 5 back to the MME 22 in a 'location response' message using standard signaling. The MME 22 then reports the latitude and longitude of the requested UE 5 back to the eNode B 12A. The response can also be included either in a modified existing message or in a new message. The request from the eNode B 12A to the MME 22 and the response from the MME 22 to the eNode B 12A are sent over an existing signaling connection in the S1-MME interface. This signaling connection is UE-specific and is identified by S1AP identifiers allocated by both the eNode B 12A and the MME 22. The S1AP identifiers are necessary since, for security reasons, the eNode B 12A should remain unaware of the UE permanent identifiers, such as an IMSI, used by the MME 22 in triggering a positioning request to the E-SMLC 28.

In another embodiment, the eNode B 12A reports to the AS 38 or OSS 35 that positioning is needed, and forwards to the AS 38 or OSS 35 the MME/eNode B S1AP Identities for the selected UE 5. The AS 38 or OSS 35 functions as a GMLC 26, and triggers positioning requests to the MME 22. This embodiment also requires modification to SLg protocol between the MME 22 or OSS 35 and GMLC 26 used to provide location information, since UE 5 permanent identifiers (e.g., IMSI, MSISDN, IMEI) are normally used as identifiers over this interface. For security reasons, the AS 38 or OSS 35 has only received the S1AP identities from the eNodeB 12A. In an alternate embodiment, the MME 22 informs the AS 38 or OSS 35 about IMSIs (or other UE permanent identifiers) corresponding to MME/eNode B S1AP Identities, for example based on a request from the AS 38 or OSS 35. The AS 38 or OSS 35 then uses the IMSIs, or other UE permanent identifiers, towards the MME 22 when triggering positioning. The eNode B 12A must also send to the AS 38 or OSS 35 an identity of the MME 22 to which the AS 38 or OSS 35 should direct positioning requests.

In yet another embodiment, the eNode B 12A reports to the AS 38 information about signal strength/quality reports, as well as TAdv, AOA and Measured neighbors measurements. The AS 38 maintains statistics, and detects frequently-occurring combinations of TAdv, AOA and measurements for UE 5 experiencing poor coverage. Over time, when enough data has been gathered and the AS detects a localized area 17 of interest, the AS 38 asks the eNode B 12A to position a UE 5 in this area, such as via the MME 22, as described above.

The network-based capacity or coverage deficiency detection, and localized area positioning, of embodiments of the present invention presents numerous advantages over the prior art. Primarily, the embodiments allow a network 10 to automatically detect such areas 15, 17, and proactively consider the deployment of low-power nodes 16, 20 to increase capacity and improve coverage in a cell 14, prior to users having a degraded user experience and complaining. Furthermore, the method is automatic, and does not require the analysis of voluminous network data by network operators or technicians to attempt to discover such areas of deficient capacity 15 or coverage 17.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A network-based method of improving communications in a cellular wireless communication network wherein a first serving node including a first transceiver provides communication services to users in a cell covering a geographic area, comprising, by the serving node:
    monitoring user activity and determining the cell has deficient capacity if a traffic load exceeds a predetermined load threshold;
    monitoring user link quality metrics for users in the cell and determining the cell has deficient coverage if a link quality metrics for a predetermined number of users fall below a predetermined quality threshold;
    determining a geographic position of one or more users in the cell; and
    in response to detecting a pattern of capacity or coverage deficiency in the cell:
        performing measurements selected from the group consisting of Timing Advance (TAdv), Angle of Arrival (AOA), and neighboring nodes signal strength on the users indicating capacity or coverage deficiency;
        determining, in response to the measurements, that the deficiency is localized in an area of the cell; and
        determining that a second serving node should be deployed within the localized area to alleviate the deficiency;
    wherein the second serving node transmits at lower power level than the first serving node.

2. The method of claim 1 wherein determining that the deficiency is localized in an area of the cell comprises:
    sending one or more of the TAdv, AOA, and signal strength measurements to an application server in the network for analysis; and
    receiving from the application server an indication of a localized area of deficiency.

3. The method of claim 2 wherein receiving an indication of a localized area of deficiency comprises receiving an indication of one or more users in the localized area of deficiency.

4. The method of claim 1 further comprising notifying an application server in the network about the capacity or coverage deficiency.

5. A serving node in a cellular wireless communication network operative to provide communication services to users in a cell covering a geographic area, comprising:
    a transceiver;
    a position measurement unit operatively connected to the transceiver and operative to perform measurements on user terminals within the cell;
    a network interface operative to communicate with other network nodes; and
    a controller operatively connected to the transceiver and the position measurement unit and operative to:
        provide communication services to users in the cell, the controller further operative to monitor traffic load and link quality metrics;
        detect a capacity or coverage deficiency based on monitored traffic load and link quality;
        in response to detecting a pattern of capacity or coverage deficiency in the cell:
            instruct the position measurement unit to perform measurements on the users indicating capacity or coverage deficiency;
            determine, in response to the measurements, that a detected deficiency is localized in an area of the cell;
            position the localized area; and
            determine that a low-power serving node should be deployed within the localized area to alleviate the deficiency;
    wherein the measurements are selected from the group consisting of Timing Advance (TAdv), Angle of Arrival (AOA), and neighboring nodes signal strength.

6. The node of claim 5 wherein the controller is operative to position the localized area by controlling the network interface to send a positioning request to a location services network node.

* * * * *